Patented June 13, 1933

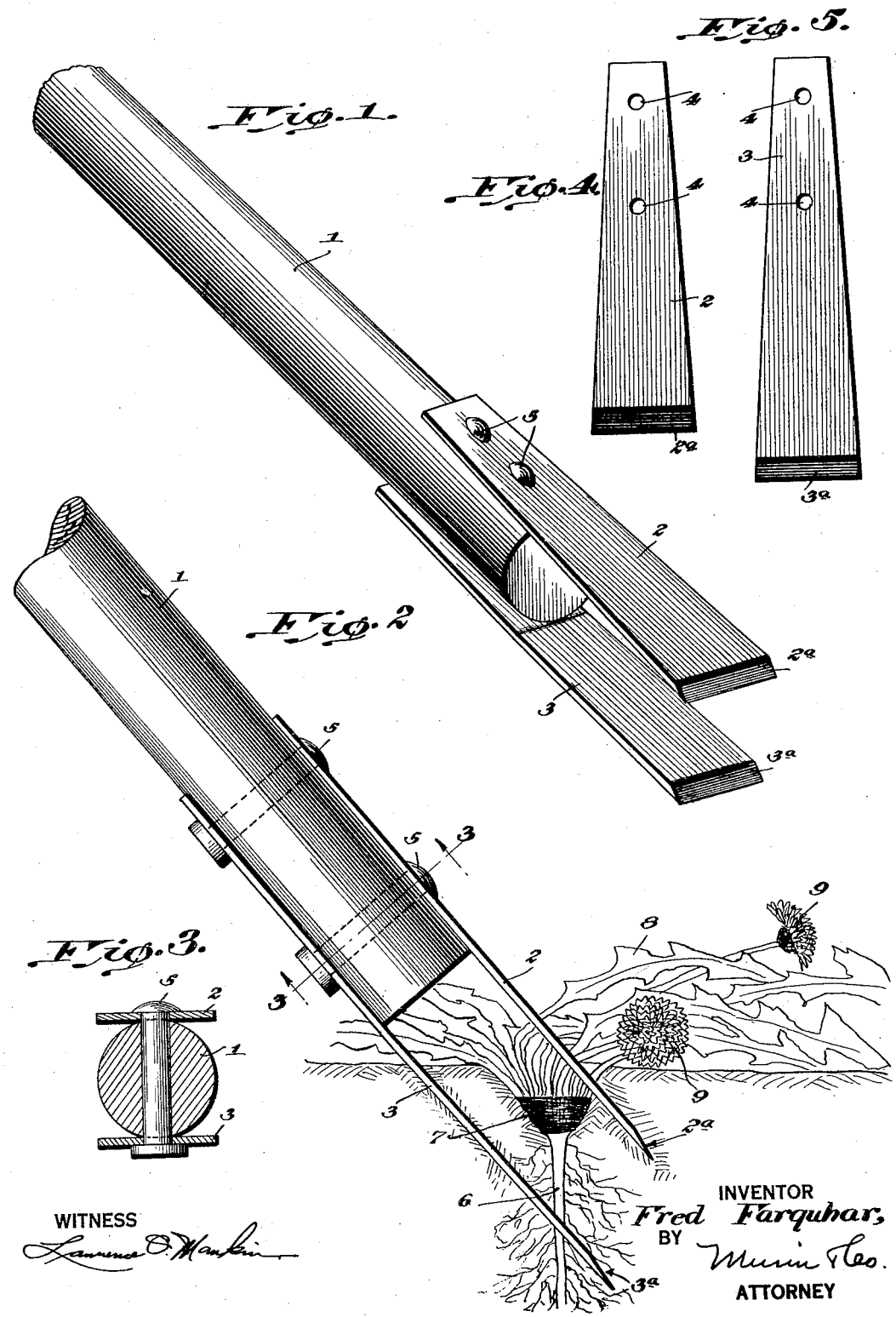

1,913,800

UNITED STATES PATENT OFFICE

FRED FARQUHAR, OF MALVERN, IOWA

TOOL

Application filed July 28, 1932. Serial No. 625,425.

My invention relates to improvements in tools, more particularly to tools for killing weeds, such as dandelions, and it consists in the combinations, constructions and arrangements herein described and claimed.

In eradicating weeds, such as dandelions, it has been customary to use some cutter, such as a spade or other tool, having a single blade and to thrust the blade in the soil to cut the tap root. Usually the weed is pulled up and this leaves a hole in the ground which is unsightly. In most cases new shoots will spring up from the root and the fact that the weed has been removed gives the new shoots access to sunlight and air, thereby facilitating their growth.

An object of the invention is to provide a tool by means of which dandelions may be killed without injuring the grass but on the other hand tending to loosen the sod so as to promote the growth of the grass.

A further object of the invention is to provide a device of the type described which is simple in construction and which can be manufactured at a low cost.

A further object of the invention is to provide a cutting tool which severs a growing plant into three sections at one movement, thus expediting the work of killing the weeds.

Other objects and advantages will appear in the following specification and the novel features of the invention will be particularly pointed out in the appended claims.

My invention is illustrated in the accompanying drawing forming part of this application, in which:—

Figure 1 is a perspective view of the tool,

Figure 2 is a view of the tool showing the side edges of the blades and their application to the weed, Figure 3 is a section on the line 3—3 of Figure 2, Figure 4 is a plan view of one of the blades, and Figure 5 is a plan view of the other blade.

In carrying out my invention I provide a handle 1 and to this handle I secure an upper blade 2 and a lower blade 3. These blades are shaped as shown in Figs. 4 and 5, respectively. They are formed of flat pieces of metal, preferably steel and are tapered from their cutting ends to their opposite ends. Bolt holes 4 are provided and bolts 5 are passed through these holes to secure the blades firmly in position.

It will be noted that the upper blade 2 is shorter than the lower blade 3. Both of the blades are bevelled on their upper sides at their ends to provide cutting edges 2a and 3a, respectively. The lower blade 3 is bent slightly toward the upper blade. In the drawing this is shown exaggerated for the purposes of illustration. The inclination is such that the perpendicular distance from the edge of the upper blade to the lower blade is about one-sixteenth of an inch.

From the foregoing description of the parts of the device the operation thereof may be readily understood. In using the device the lower blade is so directed that it will enter the soil and pass through the tap root 6 of a weed, such as a dandelion. The upper blade will pass above the crown 7 and will sever the stems of a portion of the leaves 8 and the bloom 9, as shown in Fig. 2. The weed is, therefore, cut into three portions.

The severing of the leaves and bloom prevents the development of the bloom and seed. This is not true where the plant is only severed once and that below the crown. The lower blade cuts the tap root below the crown, leaving the crown in its original position. This tends to keep the sunshine and air away from the tap root, thereby retarding the development of new shoots and in many cases causing the whole root to die.

In actual practice it has been found that this decayed crown attracts some form of insect which lays eggs and develops larvæ about a week or ten days after the plant has been cut. These larvæ feed on the old crown and tap root and thus the plant is definitely eradicated.

The death of the old plant is accelerated by the fact that the soil is loosened and this gives a chance for the germination of new grass seed. It will be observed that only one thrust of the tool is necessary and hence the weeds can be killed very quickly.

I have found that if the lower faces of the blades are bevelled to form cutting edges there is a tendency for the blades to heave the turf above them. The purpose of inclining the lower blades is to prevent soil from clinging between the blades. If the blades are parallel there is a tendency to pack the soil between the blades so that when the tool is withdrawn it pits the lawn. By inclining the lower blade when the tool is thrust into the ground there is a tendency to wedge the two blades together, but on withdrawing the tool the lower blade will tend to spring away from the soil thus leaving it in position and permitting the withdrawal of both blades.

I claim:

1. A tool comprising a handle, a blade consisting of a flat strip of metal secured to the handle on one side thereof and projecting beyond one end, a second blade secured on the opposite side of the handle at a slight inclination to the first-named blade, and being longer than the first-named blade, each of said blades having bevelled cutting edges.

2. A tool for cutting dandelions comprising a handle, an upper blade consisting of a flat piece of metal secured at one end of said handle, and a lower blade secured to said handle and extending beyond the end of the upper blade, each of said blades having a cutting edge at its lower face and said blades being disposed in angular relation.

FRED FARQUHAR.